United States Patent
Becker et al.

(10) Patent No.: US 11,313,333 B2
(45) Date of Patent: Apr. 26, 2022

(54) FUEL PUMP AND FUEL DELIVERY UNIT

(71) Applicant: Vitesco Technologies GmbH, Hannover (DE)

(72) Inventors: Dirk Becker, Alheim (DE); Michael Bämpfer, Rotenburg (DE); Jens Missun, Lohfelden (DE); Marc Völker, Magdeburg (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/754,719

(22) PCT Filed: Oct. 10, 2018

(86) PCT No.: PCT/EP2018/077560
§ 371 (c)(1),
(2) Date: Apr. 8, 2020

(87) PCT Pub. No.: WO2019/072892
PCT Pub. Date: Apr. 18, 2019

(65) Prior Publication Data
US 2020/0300202 A1    Sep. 24, 2020

(30) Foreign Application Priority Data

Oct. 12, 2017   (DE) ..................... 10 2017 218 287.3

(51) Int. Cl.
| | | |
|---|---|---|
| *F02M 37/10* | (2006.01) | |
| *H02K 11/40* | (2016.01) | |
| *F04C 2/08* | (2006.01) | |
| *F04C 2/16* | (2006.01) | |

(Continued)

(52) U.S. Cl.
CPC ............. *F02M 37/10* (2013.01); *F04C 2/086* (2013.01); *F04C 2/16* (2013.01); *F04C 11/008* (2013.01);

(Continued)

(58) Field of Classification Search
CPC ................. F02M 37/10; F02M 37/041; F02M 2037/082; F02M 37/08; H02K 11/40;
(Continued)

(56) References Cited

U.S. PATENT DOCUMENTS

| 6,142,126 A * | 11/2000 | Kanamaru ............. F02M 37/44 |
| | | 123/509 |
| 6,530,757 B1 * | 3/2003 | Soyer .................... F04D 29/026 |
| | | 417/423.14 |
| 2006/0098964 A1 * | 5/2006 | Haubold ............. F02M 31/125 |
| | | 392/447 |

FOREIGN PATENT DOCUMENTS

| CN | 101975160 | 2/2011 |
| CN | 103758758 | 4/2014 |

(Continued)

OTHER PUBLICATIONS

International Search Report issued in corresponding PCT Application PCT/EP2018/077560.

(Continued)

*Primary Examiner* — Jacob M Amick
*Assistant Examiner* — Charles J Brauch
(74) *Attorney, Agent, or Firm* — Cozen O'Connor

(57) ABSTRACT

A fuel pump includes: an electric motor; a pump stage drivable by the electric motor; and a fuel pump housing configured to accommodate the electric motor and the pump stage. The fuel pump housing has a first housing part configured to accommodate the electric motor and a second housing part configured to accommodate the pump stage. One or both of the first housing part and the second housing part are made of a conductive plastic adapted to dissipate static charges to a ground potential.

9 Claims, 3 Drawing Sheets

(51) Int. Cl.
*F04C 11/00* (2006.01)
*H02K 5/02* (2006.01)
*H02K 5/12* (2006.01)
*F02M 37/04* (2006.01)

(52) U.S. Cl.
CPC ............... *H02K 5/02* (2013.01); *H02K 5/12* (2013.01); *H02K 11/40* (2016.01); *F02M 37/041* (2013.01); *F04C 2210/1044* (2013.01); *F05C 2225/00* (2013.01); *F05C 2253/04* (2013.01); *F05C 2253/16* (2013.01); *F05C 2253/18* (2013.01)

(58) Field of Classification Search
CPC ... H02K 5/02; H02K 5/12; H02K 5/08; F04C 2/086; F04C 2/16; F04C 11/008; F04C 2210/1044; F04C 13/008; F05C 2225/00; F05C 2253/04; F05C 2253/16; F05C 2253/18
See application file for complete search history.

(56) References Cited

FOREIGN PATENT DOCUMENTS

| | | | | |
|---|---|---|---|---|
| CN | 104379934 | | 2/2015 | |
| CN | 105840498 A | * | 8/2016 | ................ F04C 2/16 |
| CN | 105840498 A | | 8/2016 | |
| DE | 4123384 | | 1/1993 | |
| DE | 42 01 401 | | 7/1993 | |
| DE | 103 24 800 | | 1/2004 | |
| DE | 697 37 403 | | 10/2007 | |
| DE | 10 2008 004 845 | | 7/2009 | |
| DE | 102008004845 A1 | * | 7/2009 | ............ F04C 11/008 |
| DE | 102018220811 | | 6/2020 | |
| EP | 0222034 | | 5/1987 | |
| EP | 0 754 483 | | 1/1997 | |
| JP | 2011 117434 | | 6/2011 | |
| WO | WO 00/60231 | | 10/2000 | |
| WO | WO-0060231 A1 | * | 10/2000 | ............ H02K 5/225 |

OTHER PUBLICATIONS

Written Opinion issued in corresponding PCT Application PCT/EP2018/077560.

Office Action issued in corresponding German Application No. 10 2017 218 287.3.

Chinese Office Action dated Jun. 2, 2021 issued in Chinese Patent Application No. 201880060711.4.

* cited by examiner

FUEL PUMP AND FUEL DELIVERY UNIT

CROSS REFERENCE TO RELATED APPLICATIONS

This is a U.S. national stage of International application No. PCT/EP2018/077560, filed on Oct. 10, 2018, which claims priority to German Application No. 10 2017 218 287.3, filed Oct. 12, 2017, the content of each of which is incorporated herein by reference.

BACKGROUND OF THE INVENTION

1. Field of the Invention

The invention relates to a fuel pump and to a fuel delivery unit having the fuel pump for use in a fuel tank of a vehicle for delivering fuel to an internal combustion engine. A "vehicle" is to be understood here as meaning any type of vehicle which has to be supplied with a liquid and/or gaseous fuel for operation, but in particular passenger vehicles and/or utility vehicles.

2. Description of the Prior Art

Fuel pumps and fuel delivery units are widely known from the prior art. In addition to a pump stage, the fuel pump also comprises an electric motor which drives the pump stage. The electric motor and the pump stage are rolled together with a sheet-metal casing or sheet-metal cylinder, which substantially encapsulates, and at the same time sealingly encloses, both the electric motor and the pump stage.

In automotive engineering, electrically conductive or antistatic fuel lines made from plastic have long been used in production to dissipate static charges arising as a result of conveying fuel. These prevent a static charge at high flow rates, which in the worst case may lead to flying sparks and spontaneous combustion of a vehicle. To be electrically conductive, such plastic lines are formed either entirely from an electrically conductive plastic, or are provided with at least one electrically conductive layer, and therefore the static charge can be dissipated to the ground potential.

SUMMARY OF THE INVENTION

An object on which the invention is based is to improve such a dissipation of static charges to a ground potential.

This object may be achieved by a fuel pump comprising an electric motor, a pump stage, which can be driven by the electric motor, and a fuel pump housing accommodating the electric motor and the pump stage.

According to an aspect of the invention, the fuel pump housing has a first housing part for accommodating the electric motor and a second housing part for accommodating the pump stage, wherein the first housing part and/or the second housing part are/is formed from a conductive plastic for dissipating static charges to a ground potential.

Such a conductive formation of the first housing part and/or the second housing part from plastics supports the use, which is described at the beginning and is known from the prior art, of electrically conductive or antistatic fuel lines made from plastic.

According to one aspect of the present invention, the plastic used for the production of the first housing part and/or the second housing part can be provided with graphite powder, which ensures the conductivity of the plastic.

According to a further aspect of the present invention, the plastic used for the production of the first housing part and/or the second housing part can be provided additionally or alternatively with carbon fibers, which ensure the conductivity of the plastic.

According to a further aspect of the present invention, the plastic used for the production of the first housing part and/or the second housing part can be provided additionally or alternatively with metal fibers, which ensure the conductivity of the plastic.

Furthermore, a fuel delivery unit with a fuel pump of the above-described type is proposed.

BRIEF DESCRIPTION OF THE DRAWINGS

The invention will be explained in detail in the following text with reference to the illustrations in the figures. Further advantageous refinements of the invention are apparent from the dependent claims and the description below of preferred embodiments. For this purpose:

DETAILED DESCRIPTION OF THE PRESENTLY PREFERRED EMBODIMENTS

Figure 1:
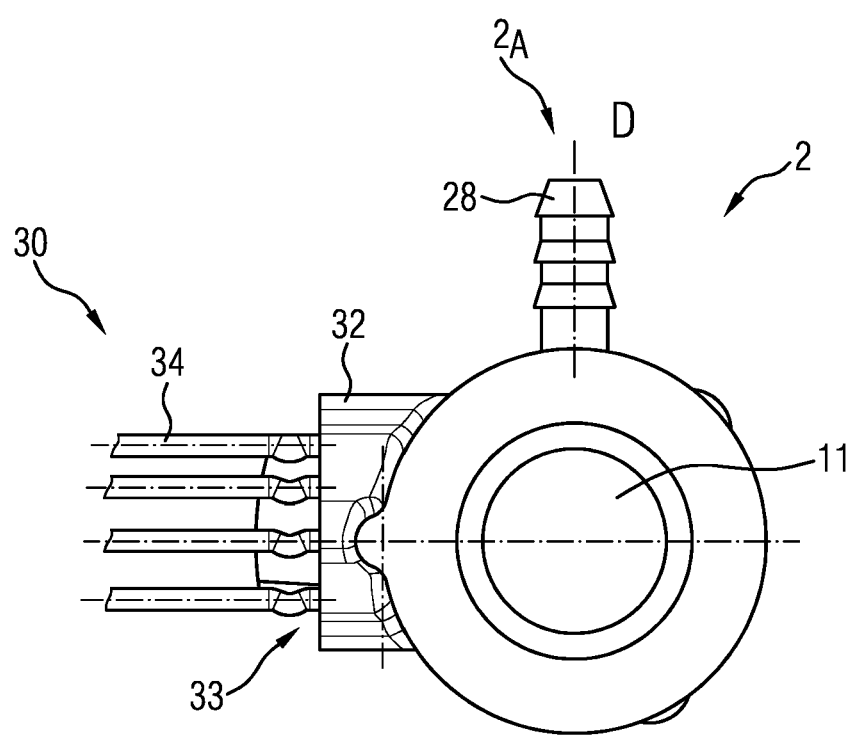
FIG. 1 shows a top view of a proposed fuel pump.
Figure 1:
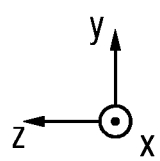
Figure 2:
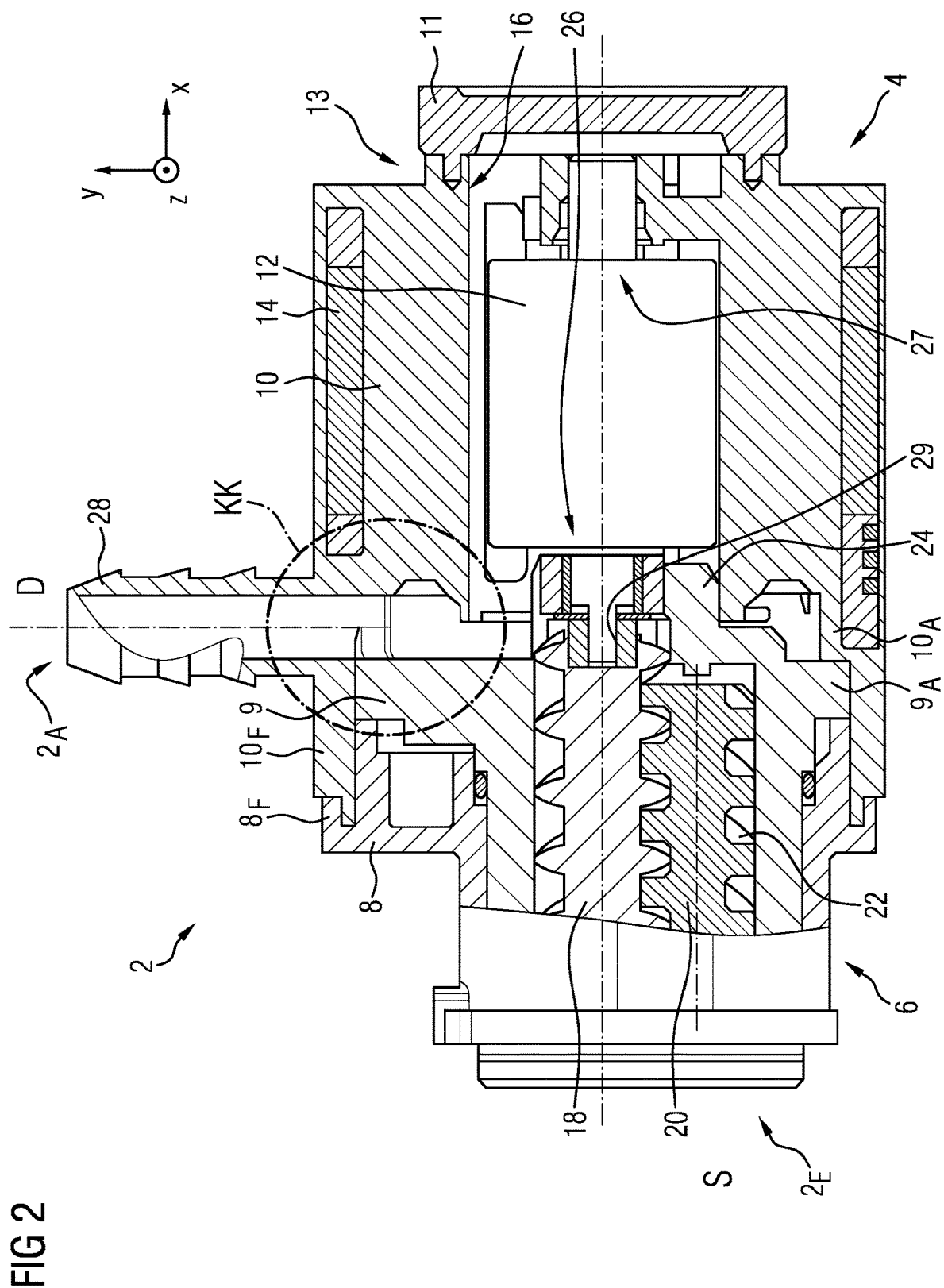
FIG. 2 shows a first side view of the fuel pump shown in FIG. 1.
Figure 3:
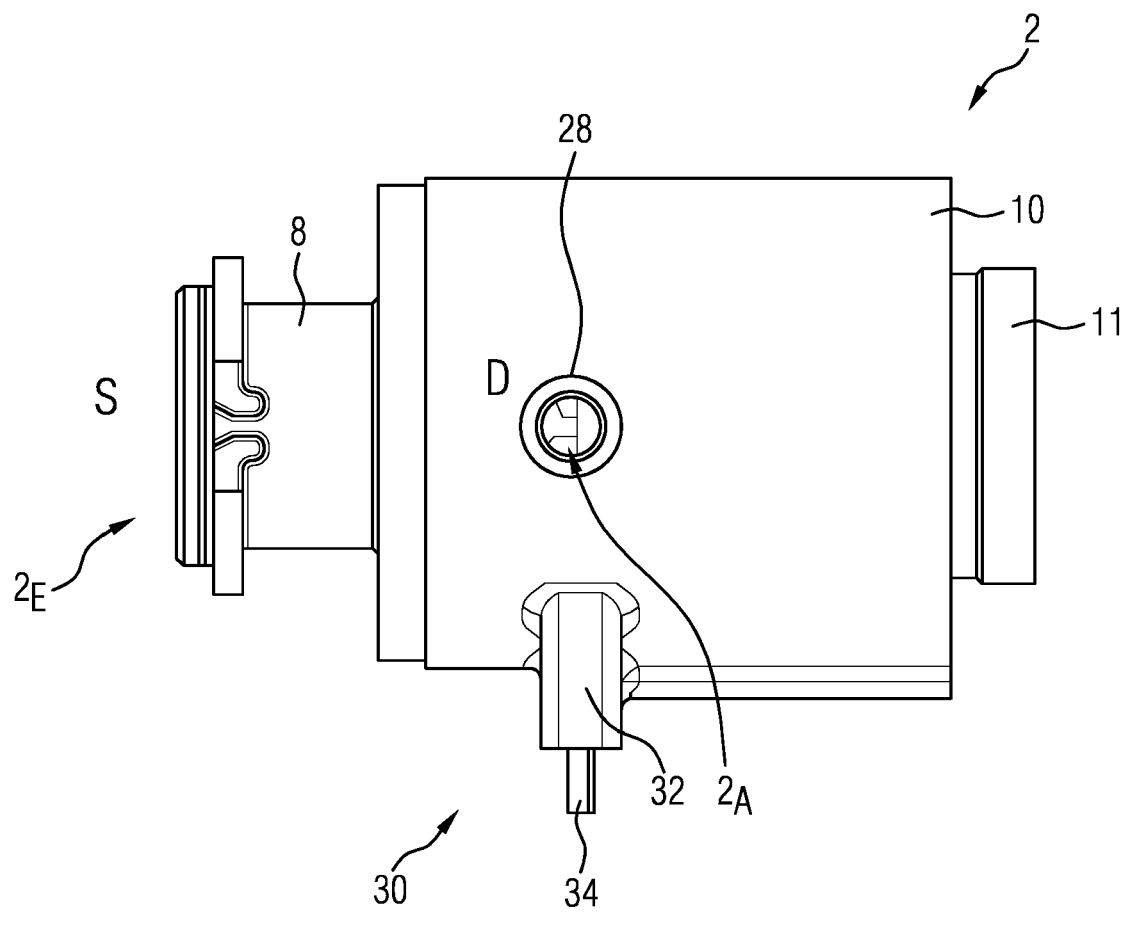
FIG. 3 shows a second side view of the fuel pump shown in FIG. 1.

With regard to FIGS. 1, 2, and 3, a fuel pump 2 is proposed. The fuel pump 2 has an electric motor 4, a pump stage 6, for example in the form of a screw-type pump stage, which can be driven by the electric motor 4, and a fuel pump housing 8, 9, 10 accommodating the electric motor 4 and the screw-type pump stage 6. The fuel pump housing 8, 9, 10 includes a first housing part 10 made from plastic with a receptacle 16, in which the electric motor 4 is arranged, and a second housing part 8 made from plastic, which accommodates the screw-type pump stage 6. The screw-type pump stage 6 comprises a pump housing 9 which is joined to a pump cover 8. The pump cover 8 forms the above-described second housing part.

The pump cover 8 is joined via a section 8F projecting circumferentially in the axial direction X-X of the fuel pump 2 to an associated section $10_F$ of the housing part 10 projecting in the axial direction X-X. At the joining point, the pump cover 8 is also connected to the housing part 10 in an integrally bonded manner. The integrally bonded connection can be formed as an adhesive bond and/or welded joint. This connection acts in a sealing manner with respect to conveyed fuel.

As can be seen, for example, in FIG. 2, on the delivery side D of the pump housing 9 an offset section 9A is formed which acts as an abutment, is provided with a planar abutment surface, and abuts against an associated planar abutment section 10A of the housing part 10. The pump cover 8 in turn abuts with its delivery-side end, which is provided with a planar abutment surface, against the abutment section 9A in a planar manner.

Between the pump housing 9 and the pump cover 8, there is arranged a radial seal in the form of an O ring, which firstly acts sealingly with respect to the conveyed fuel, and secondly centers the pump cover 8 with respect to the pump housing 9 in a floating manner.

Alternatively thereto, an embodiment of a screw-type pump stage which goes without such a pump cover is also conceivable. In the case of such a cover-free screw-type pump stage, the pump housing 9 forms the second housing part 8 which is joined to the first housing part 10 and is connected thereto in an integrally bonded manner.

Here, two opposed screw spindles 18, 20 which are arranged in the pump housing 9 form, together with the pump housing 9, delivery chambers 22, which move from a suction side S to a delivery side D of the pump stage 6 as a result of a rotation of the screw spindles 18, 20. Or, put differently, the delivery chambers 22 move in the direction of the delivery side D as a result of a rotation of the screw spindles 18, 20.

A pump housing section 24 acting in a centering manner in relation to the first housing part 10 projects into the receptacle 16, to join the pump housing 9 to the housing part 10, and provides a bearing point 26 of the rotor 12 of the electric motor 4, into which bearing point the associated shaft end of the rotor 12 extends. For the connection to the screw spindle 18 acting as a drive spindle, this shaft end engages via a projecting section into a coupling 29, which sits as such on the drive spindle 18 in a form-fitting manner. By contrast, the other bearing point 27, into which the other shaft end of the rotor 12 extends, is provided by the housing part 10 itself. The bearing point 27 is integrally formed here on the receptacle 16 at a cover-side end of the housing part 10. This means that the bearing point 27 is formed jointly during the production of the housing part 10 from plastics.

The pump housing 9 is oriented in the circumferential direction in relation to the housing part 10. For this purpose, a rib section, not illustrated in the figures, which is integrally formed in the radial direction on the delivery side of the pump housing 9 and is introduced into a corresponding recess of the housing part 10, is provided.

Furthermore, permanent magnets 14 are buried in the housing part 10 in a manner distributed over the circumference and interact with a laminated core of the rotor 12, which bears windings and forms poles and is also referred to as a laminated armature core.

A third housing part 11 acting as a cover and made from plastic is also provided, the housing part 11 being joined at a joining point 13 to the housing part 10 and being connected thereto in an integrally bonded manner. This connection also acts in a sealing manner with respect to the conveyed fuel. The integrally bonded connection can be formed here as an adhesive bond and/or welded joint. Alternatively thereto, such a cover 11 may also be omitted. Should the cover 11 be omitted, the correspondingly closing section of the housing part 10 would be formed during the production of the housing part 10 from plastics.

As illustrated, for example, in FIGS. 1 and 3, a connecting branch 28 for connection to a fuel line and a connecting bushing 30 for the electrical connection of the electric motor 4 are led away from the housing part 10 transversely—and in this exemplary embodiment orthogonally—with respect to a longitudinal direction X-X of the fuel pump 2. The connecting bushing 30 comprises a section 32, which is integrally formed on the housing part 10, and which has contacts 33 which are connected to lines 34, wherein the lines 34 lead away transversely or orthogonally with respect to the longitudinal direction X-X. Such an orthogonality should be understood here as being only by way of example and is not necessarily required since leading the connecting branch 20 and the connecting bushing 18 away from the housing part 10 in the transverse direction even in a manner differing from a right angle with respect to the longitudinal direction X-X contributes to saving on construction space in the longitudinal direction X-X.

With regard, for example, to FIG. 2, the pump housing 9 is arranged with respect to the housing part 10 such that the pump housing 9, together with the housing part 10, forms a fuel duct KK leading into the connecting branch 28, which acts as a hydraulic outlet. This fuel duct KK is in a flow connection or fluidic communication connection not only with the connecting branch 28, but also with the receptacle 16, in which the rotor 12 is arranged, to permit flow around the rotor 12 for cooling purposes. This means that the fuel duct KK guides the conveyed fuel both transversely with respect to the longitudinal direction X-X of the fuel pump 2 into the connecting branch 28 and also in the longitudinal direction X-X of the fuel pump 2 into the receptacle 16.

For dissipation of static charges to a ground potential, such as static charges arising as a result of conveying fuel, it is proposed here to form the housing part 10 and/or the housing part 8, 9 from a conductive plastic. Such a conductive plastic could be provided, for example, with graphite powder, carbon fibers and/or with metal fibers to ensure conductivity of the plastic.

Such a conductive formation of the housing part 10 and/or the housing part 8, 9 from plastics supports the use, which is known from the prior art, of electrically conductive or antistatic fuel lines made from plastic.

A delivery of fuel by the fuel pump 2, which as such is also referred to as a fuel delivery assembly, is represented as follows, making reference to FIG. 2:

the fuel pump 2 sucks up the fuel via suction-side inlet openings $2_E$ on the pump cover 8 into the delivery chambers 22 via which the fuel is then conveyed as far as at least one delivery-side outlet opening of the pump housing section 24, through which the fuel then flows both into the receptacle 16 for flowing around the rotor 12 and into the flow duct KK and then on as far as the outlet branch 28, via the outlet opening $2_A$ of which the fuel finally emerges from the fuel pump or the fuel delivery assembly 2. The at least one delivery-side outlet opening of the pump housing section 24 is accordingly in flow connection or fluidic communication connection both with the fuel duct KK and with the receptacle 16.

Although exemplary embodiments have been explained in the above description, it should be noted that numerous modifications are possible. Furthermore, it should be noted that the exemplary embodiments are merely examples which are not intended to limit the scope of protection, the applications and the structure in any way. Instead, the above description gives a person skilled in the art a guideline for the implementation of at least one exemplary embodiment, wherein various changes may be made, especially with regard to the function and arrangement of the component parts described, without departing from the scope of protection as apparent from the claims and combinations of features equivalent thereto.

The invention claimed is:

1. A fuel pump, comprising:
   an electric motor (4);
   a pump stage (6) drivable by the electric motor (4); and
   a fuel pump housing (8, 9, 10) configured to accommodate the electric motor (4) and the pump stage (6),
   wherein the fuel pump housing (8, 9, 10) comprises:
      a first housing part (10) configured to accommodate the electric motor (4), the first housing part (10) being made of a conductive plastic adapted to dissipate static charges to a ground potential; and
      a second housing part (8, 9) configured to accommodate the pump stage (6) and being made of the conductive plastic.

2. The fuel pump as claimed in claim 1, wherein the conductive plastic comprises graphite powder.

3. The fuel pump as claimed in claim 1, wherein the conductive plastic comprises carbon fibers.

4. The fuel pump as claimed in claim 1, wherein the conductive plastic comprises metal fibers.

5. The fuel pump as claimed in claim 1, wherein the conductive plastic comprises graphite powder and carbon fibers.

6. The fuel pump as claimed in claim 1, wherein the conductive plastic comprises graphite powder and metal fibers.

7. The fuel pump as claimed in claim 1, wherein the conductive plastic comprises carbon fibers and metal fibers.

8. The fuel pump as claimed in claim 1, wherein the conductive plastic comprises graphite powder, carbon fibers and metal fibers.

9. A fuel delivery unit comprising the fuel pump (2) as claimed in claim 1.

\* \* \* \* \*